United States Patent [19]

Girault

[11] Patent Number: 5,232,333
[45] Date of Patent: * Aug. 3, 1993

[54] SINGLE FLOW TURBOPUMP WITH INTEGRATED BOOSTING

[75] Inventor: Jean-Philippe N. Girault, Tourny, France

[73] Assignee: Societe Europeenne de Propulsion, Suresnes, France

[*] Notice: The portion of the term of this patent subsequent to Mar. 30, 2010 has been disclaimed.

[21] Appl. No.: 815,127

[22] Filed: Dec. 27, 1991

[30] Foreign Application Priority Data

Dec. 31, 1990 [FR] France ............... 90 16546

[51] Int. Cl.$^5$ .............................................. F01D 1/12
[52] U.S. Cl. ................... 415/58.5; 415/58.7; 415/111; 415/66; 415/68; 415/69; 415/143
[58] Field of Search ............. 415/66, 68, 69, 143, 415/110, 111, 115, 216.1, 52.1, 58.4, 58.5, 58.7

[56] References Cited

U.S. PATENT DOCUMENTS

| 358,777 | 3/1887 | Hay ........................ 415/69 |
| 2,771,036 | 11/1956 | Baez ........................ 415/69 |
| 2,832,292 | 4/1958 | Edwards ................... 415/58.4 |
| 3,004,494 | 10/1961 | Corbett . |
| 3,093,084 | 6/1963 | Derderian . |
| 3,103,176 | 9/1963 | Lang et al. . |
| 4,400,134 | 8/1983 | Sweeny ..................... 415/69 |
| 4,408,953 | 10/1983 | Nasvytis et al. . |
| 4,449,888 | 5/1984 | Balje ........................ 415/143 |

FOREIGN PATENT DOCUMENTS

| 0060993 | 4/1983 | European Pat. Off. . |
| 374020 | 6/1990 | European Pat. Off. . |
| 885050 | 8/1953 | Fed. Rep. of Germany . |
| 1001113 | 6/1957 | Fed. Rep. of Germany . |
| 1343011 | 10/1963 | France . |

OTHER PUBLICATIONS

"Better Power/Speed Cavitation for Centrifugal Pumps", O. V. Baibakov, et al., Russian Engineering Journal, vol. 53, No. 11, pp. 31–35.

Primary Examiner—Thomas E. Denion
Attorney, Agent, or Firm—Weingarten, Schurgin, Gagnebin & Hayes

[57] ABSTRACT

Inside a single casing the turbopump comprises a main shaft driven by a turbine, a secondary shaft coaxial with the main shaft, a low pressure impeller mounted on the secondary shaft to create a medium pressure flow which is brought back to flow parallel to the axis of the turbopump by a baffle and which is deflected through 180° in a return channel so as to come back parallel to the axis of the turbopump towards a high pressure impeller mounted on the main shaft inside the secondary shaft. The entire HP flow formed by the HP impeller is output via the insides of curved hollow blades forming a portion of the LP impeller, this HP centrifugal flow thus establishes a driving torque for the LP impeller.

19 Claims, 11 Drawing Sheets

SINGLE FLOW TURBOPUMP WITH INTEGRATED BOOSTING

FIELD OF THE INVENTION

The present invention relates to a single flow turbopump with integrated boosting, for pressurizing a fluid.

Turbopumps are used in various different fields, and in particular in space for pressurizing propellant components.

The search for a turbopump of increased throughput with a simultaneous reduction in size and mass leads to using high speeds of rotation.

At high speeds of rotation, the risk of cavitation increases. That is why proposals have already been made to associate a high pressure pump with a low pressure boost pump, the boost pump providing the increase in pressure needed at the inlet to the high pressure impeller to avoid any cavitation at high speeds of rotation.

PRIOR ART

Different ways of driving a low pressure boost pump and different ways of associating the low pressure (LP) and high pressure (HP) circuits have already been proposed.

Figure 2A:
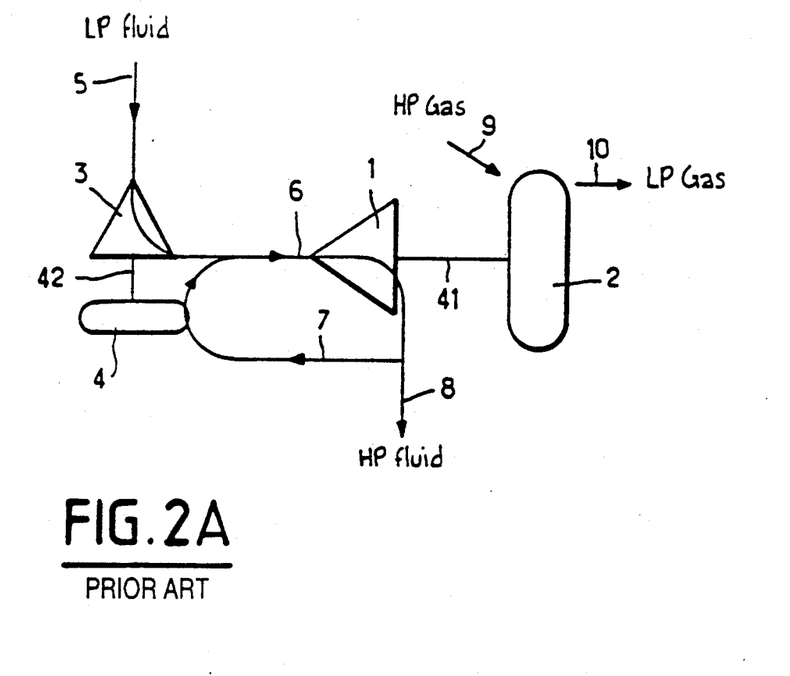
FIG. 2A is a theoretical diagram showing a prior art association between a turbopump and a low pressure boost pump disposed at the inlet to the turbopump and driven by a hydraulic turbine fed with a flow of high pressure fluid taken from the flow of high pressure fluid at the outlet from the turbopump.

Thus, a conventional way of driving a low pressure boost pump 3 shown diagrammatically in FIG. 2A is constituted by a branch circuit. In that case, a portion 7 of the HP fluid conveyed by the high pressure pump 1 is recycled from the outlet from the HP pump 1 to the low pressure hydraulic turbine 4 which is used for driving the LP boost pump 3. The LP fluid 5 inserted into the LP pump 3 has a medium pressure (MP) at the outlet thereof such that the flow of medium pressure fluid 6 applied to the inlet of the HP pump 1 enables all cavitation within the HP pump 1 to be avoided even if it operates at a high speed of rotation. The HP fluid 7 recycled via the hydraulic turbine 4 driving the shaft 42 of the LP pump 3 constitutes only a relatively small fraction of the working HP flow 8. The shaft 41 of the HP pump 1 is itself driven in conventional manner by a gas turbine 2 having an HP gas inlet 9 and an LP gas outlet 10.

Figure 2B:
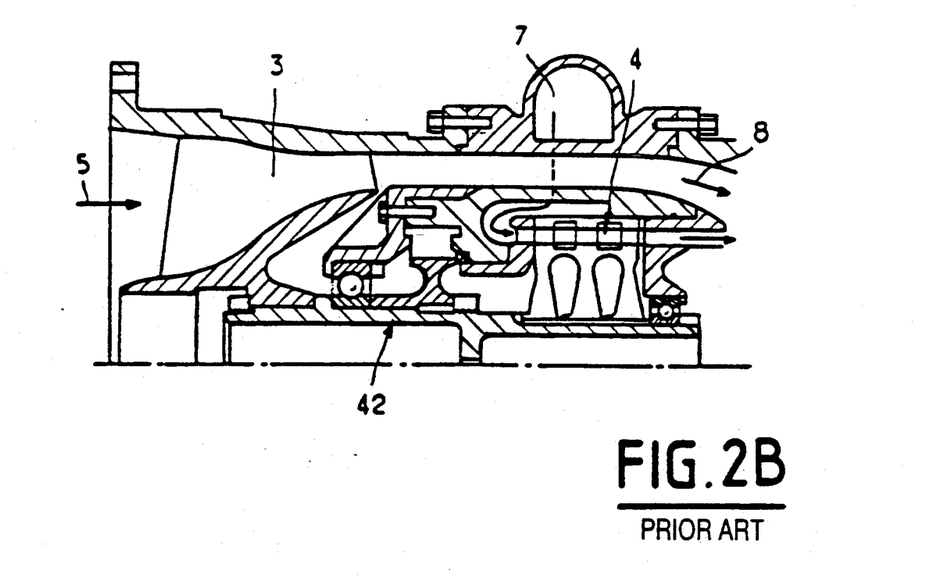
FIG. 2B is an axial half-section view through one example of known architecture for a turbopump associated with a low pressure boost pump in compliance with the theoretical diagram of FIG. 2A.

FIG. 2B shows a particular embodiment of a pump such as that shown diagrammatically in FIG. 2A and as described in the NASA monograph entitled "Turbopump systems for liquid rocket engines" SP-8107, pp. 53-55. FIG. 2B thus shows an LP boost pump 3 driven by a hydraulic turbine 4 fed by a fraction 7 of the HP fluid 8 delivered by the HP pump 1, in turn driven by a gas turbine (not shown in FIG. 2B).

Systems of the type described with reference to FIGS. 2A and 2B require bulky high pressure to low pressure hydraulic connections that are difficult to seal, with recycling a small flow rate under large head losses not providing the best functional compromise and not enabling all of the cavitation problems at the HP impeller of the HP pump 1 to be remedied. In addition, using an "in line" structure in which the LP pump 3 is located ahead of the HP pump 1 gives rise to a hydraulic assembly that is bulky.

Figure 3A:
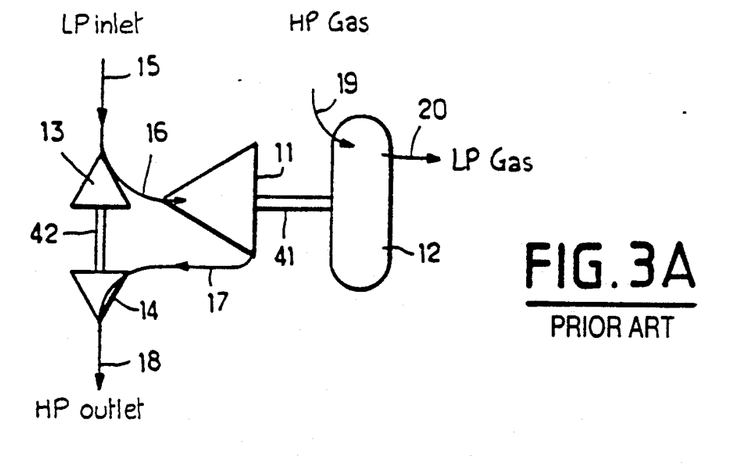
FIG. 3A is a theoretical diagram showing a prior art association of a turbopump and a low pressure boost pump disposed at the inlet of the turbopump and driven by a hydraulic turbine fed in cascade by all of the flow of high pressure at the outlet of the turbopump.

FIGS. 3A to 3D show systems that associate an LP boost pump 13 with an HP pump 11, using a cascade circuit. FIG. 3A is a theoretical diagram of such a system, in which the entire fluid flow 17 leaving the HP pump 11 actuates, with little expansion, the LP hydraulic turbine 14 which drives the boost pump 13 via the LP shaft 42, which boost pump receives the inlet LP fluid flow 15 and applies it to the inlet of the HP wheel of the HP pump 11 in the form of a fluid flow 16 at medium pressure. As in the system of FIG. 2A, the shaft 41 of the HP pump 11 delivers an outlet flow 18 which is conventionally entrained by a gas turbine 12 having an HP gas inlet 19 and an LP gas outlet 20.

Figure 3B:
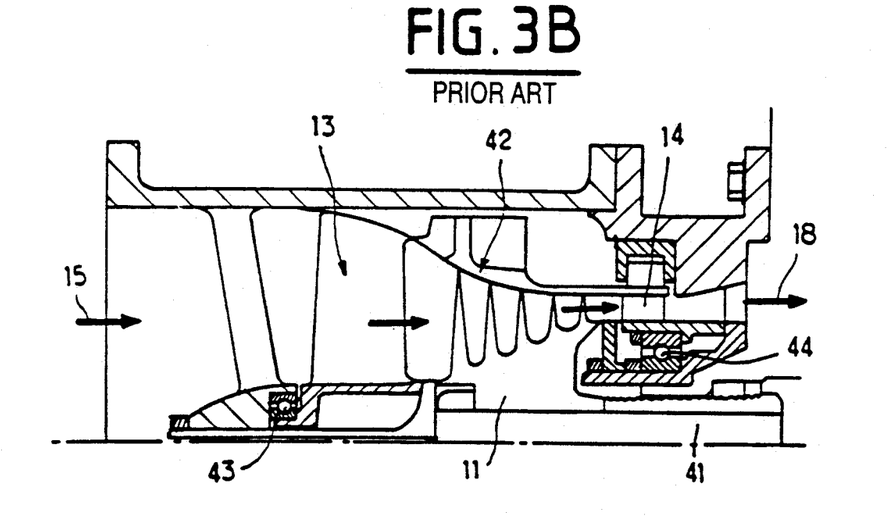
FIG. 3B is an axial half-section view through a first example of known architecture for a turbopump associated with a low power low pressure boost pump in compliance with the theoretical diagram of FIG. 3A.
Figure 3C:
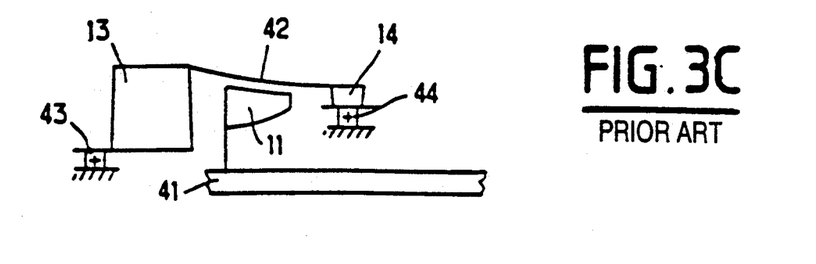
FIG. 3C is a simplified diagram showing some of the components implemented in the architecture of FIG. 3B.

FIGS. 3B and 3C show one embodiment of the FIG. 3A circuit as applied to a low power boost-pump 13. FIG. 3B shows the arrangement of the various components of the FIG. 3A system apart from the gas turbine 12 which is not shown, and FIG. 3C shows in simplified manner the relative positions in the FIG. 3B arrangement of the main drive shaft 41 driven by the gas turbine 12 and of the hydraulically driven shaft 41 together with its bearings 43, 44 for supporting it relative to a frame. FIG. 3C shows symbolically the rotary components that rotate with the shafts 41 and 42, i.e. the rotary components of the hydraulic turbine 14 and of the LP pump 13 which are secured to the LP secondary shaft 42 and the rotary components of the HP pump 11 which are secured to the main HP shaft 41.

Figure 3D:
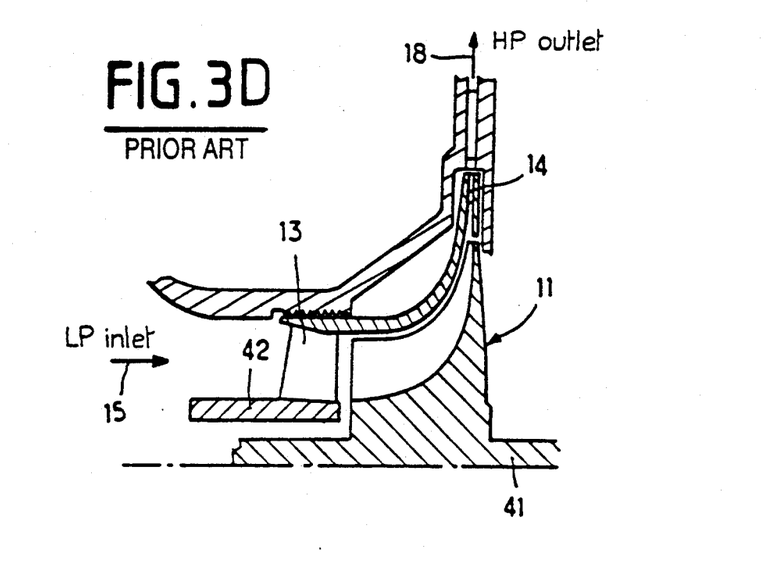
FIG. 3D is an axial half-section view through a second example of known architecture for a turbopump associated with a low pressure inducer in compliance with the theoretical diagram of FIG. 3A, but using greater power than in the architecture of FIGS. 3B and 3C.

FIG. 3D shows another particular embodiment of a circuit that uses a cascade cycle like that shown in FIG. 3A, and as described in a work by O. E. Balje entitled "Turbomachines", p. 429, published by Wiley in 1981. In that case, the hydraulic turbine 14 is constituted by a rotary diffuser placed downstream from the HP impeller of the HP pump 11 and secured to an LP inducer 13 which performs a function of the same kind as the boost pump 13 in FIG. 3A, and which is placed upstream from the impeller of the HP pump 11.

Nevertheless, experiments performed on an arrangement such as that shown in FIG. 3D have encountered complex problems with bearings, and have been limited to tests at low speed and low power.

Figure 4:
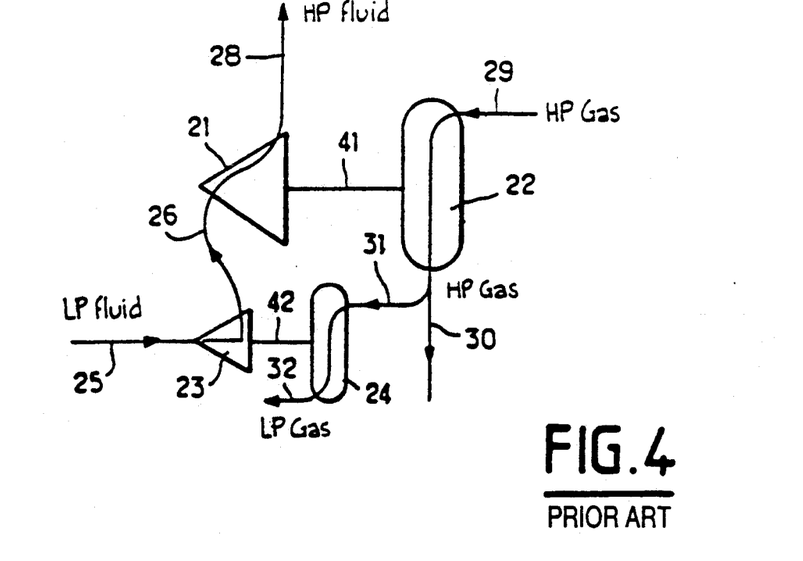
FIG. 4 is a theoretical diagram showing a prior art association of a turbopump and a low pressure boost pump disposed at the inlet to the turbopump and driven by an auxiliary gas turbine fed with a flow of high pressure gas taken from the flow of high pressure gas at the outlet from the main gas turbine for driving the turbopump.

FIG. 4 shows a theoretical diagram for a turbopump system having a boost LP pump in which a boost LP pump 23 is integral with a shaft 42 driven by a gas turbine 24 fed from a main gas flow 31 for driving the HP pump 21. In FIG. 4, reference 29 designates the HP gas flow applied to the main gas turbine 22 and 32 designates the LP gas flow from the auxiliary gas turbine 24. References 25, 26, and 28 respectively designated the LP liquid flow at the inlet to the boost pump 23, the MP liquid flow from the boost pump 23 as applied to the HP pump 21, and the HP liquid flow delivered by the HP pump 21.

A system such as that shown in FIG. 4 suffers from problems of differential expansion between its cold parts adjacent to the pump and its hot parts adjacent to the turbine, and from problems of sealing between the liquid circuits and the gas circuits, which problems are inherent to the cycle shown. A cycle of the kind shown in FIG. 4 is also to be proscribed when using fluids that are chemically very active, such as liquid oxygen.

In general, systems such as that shown in FIG. 4 present high levels of power per unit mass, are complex, and because they associate two turbomachines, they suffer from considerable bulk. Such an architecture is difficult to assemble, requires a large number of parts, and multiple fixing points that may lead to difficult vibration problems in structures that are suspended from the propulsion chamber.

OBJECT AND SUMMARY OF THE INVENTION

The present invention seeks to remedy the drawbacks of the prior art systems and to enable a low pressure boost pump to be used in association with a turbopump for the purpose of eliminating or limiting the phenomenon of cavitation in the portion of the high pressure pump that operates at very high speeds of rotation, while providing a high degree of compactness overall and while still retaining a high level of performance.

These objects are achieved by a single flow turbopump with integrated boosting for pressurizing a fluid, characterized in that it comprises within a single casing: a main shaft driven by a turbine, a secondary shaft coaxial with the main shaft, at least one low pressure inducer mounted inside the casing on the secondary shaft in the vicinity of an inlet for low pressure fluid, at least one low pressure impeller mounted on the secondary shaft downstream from the low pressure inducer, a low pressure baffle secured to the casing and disposed downstream from the low pressure impeller to restore the medium pressure fluid flow to a direction parallel to the axis of the turbopump, a return channel for deflecting the medium pressure fluid flow from the baffle through 180° and for returning said flow parallel to the axis of the turbopump towards a high pressure impeller mounted on the main shaft inside the secondary shaft in such a manner as to deliver the entire high pressure centrifugal flow formed by the high pressure impeller through the insides of curved hollow blades forming a portion of said low pressure impeller, said high pressure centrifugal flow flowing through the insides of said curved hollow blades generating driving torque for the low pressure impeller, and a delivery channel secured to the casing and collecting the high pressure fluid after it has passed through said curved hollow blades, the high pressure impeller constituting a high pressure pump coupled to a low pressure boost pump constituted by the low pressure inducer and the low pressure impeller and constituting a unitary assembly.

The turbopump further includes a high pressure inducer mounted on the main shaft between the return channel and the high pressure impeller.

By the principle which consists in sharing the power between a low pressure pump and a high pressure pump incorporated in the low pressure pump it is possible for a turbopump of the invention to obtain high efficiency with the possibilities for optimizing the pumps being as great or even greater than with separate pumps, and while obtaining a high speed of rotation. The shorter the circuits compared with prior art systems such as those of FIGS. 2A, 2B, 3A to 3D, and 4, the shorter the in-line head losses, and consequently the higher the efficiency.

The particularly compact architecture of the turbopump of the invention with the turbomachine having integrated therein a rotary supercharger constituted by a boosting impeller driven by the pressurized fluid itself and intended to increase the pressure of the fluid at its inlet into the main pump gives rise to a significant decrease in the total mass of the machine and in its bulk while reducing the number of parts it requires and without increasing the difficulty of producing the parts.

These advantages are particularly important in the context of a turbopump for a rocket engine insofar as the architecture of the machine and its installation on the propulsive assembly are both greatly simplified by the reduction in the number of parts and of connections to the engine.

Reducing the time required for assembling the machine and for installing it on the propulsive assembly reduces costs.

Reducing the number of members, sensitivity to vibration, and complexity in assembly increases safety in operation.

Overall design is simplified because there are no special circuits for recovering and handling leaks of liquid or of gas, and it is possible to use a delivery channel that is simpler in shape than a volute (it may even be a torus), thereby reducing cost.

Because of the special structure of the mechanical energy exchanger that enables the liquid flow pressurized by the main pump to deliver a small fraction of said energy to the boosting impeller, there are practically no heat exchanges over and above the exchanges of mechanical energy.

Making the mechanical energy exchanger in the form of a turbine-impeller having hollow blades contributes to obtaining a machine which is compact overall by combining two functions that are performed by separate members in prior art embodiments. Thus, according to the invention, the insides of the hollow blades having the flow pressurized by the main pump passing therethrough act as a turbine for the low pressure pump while the outsides of these blades act as the impeller of the boost pump.

In a first embodiment of the invention, the low pressure boost pump defines a medium pressure fluid flow which is essentially parallel to the axis of the turbopump, whereas the high pressure pump is arranged in such a manner that the high pressure impeller delivers the high pressure fluid via the insides of the curved hollow blades in a plane that is essentially perpendicular to the axis of the turbopump.

This disposition which is more particularly adapted to low specific speeds giving rise to centrifugal high pressure impellers is more suitable for application to dense fluids. It facilitates adjusting dynamic seals by making use of clearances that are purely radial which are capable of compensating automatically.

In another embodiment of the invention, the low pressure boost pump is of the helico-centrifugal type, and the high pressure pump is arranged in such a manner that the high pressure impeller delivers the high pressure fluid via the insides of the curved hollow blades of the low pressure impeller in a plane that is inclined at an angle of less than 90° relative to the axis of the turbopump.

This disposition is particularly adapted to high specific speeds giving rise to axial or helico-centrifugal pressure impellers and it is most applicable to low density fluids. It makes it possible to obtain an axial resultant that is not great and easily taken up by a balancing device installed on the boost pump, for example.

The main shaft driven at high speed by the turbine is mounted relative to the casing firstly by means of a hydrostatic bearing disposed between the low pressure baffle and the high pressure inducer or the high pressure impeller, and secondly by a bearing suitable for high speeds and mounted in the backplate of the return channel.

The secondary shaft is mounted on the main shaft via a roller bearing and via a pair of ball bearings.

This disposition with four bearings makes it possible to obtain a high speed for rotation for the HP main shaft and free rotation for the low pressure assembly driven by the hydraulic turbine.

It may be observed that the bearings placed between the LP pump and the HP pump rotate at a low relative speed which corresponds to the difference between the speeds of rotation of the HP main shaft and of the LP secondary shaft. As a result, the bearings are subject to little wear and their lifetime is increased.

In a particular embodiment, said bearing mounted in the backplate of the return channel is a ball bearing that is lubricated and cooled by a low flow rate of medium pressure fluid taken from the outlet of the low pressure baffle via a short recirculation channel in the wall of the return channel.

In another particular embodiment, said bearing mounted in the backplate of the return channel is a fluid bearing or a foil bearing fed with a small flow rate of medium pressure fluid taken from the outlet of the low pressure baffle by a short recirculation channel formed in the wall of the return channel.

In yet another particular embodiment, said bearing mounted in the backplate of the return channel is an active magnetic bearing cooled by a low flow rate of medium pressure fluid taken from the outlet of the low pressure baffle by a short recirculation channel formed in the wall of the return channel.

The low flow rate of medium pressure fluid taken via said recirculation channel is dumped at a low pressure point of the turbopump such as the inlet of the low pressure pump, via a channel included in the main shaft and coaxial therewith.

This disposition avoids any external pipework, minimizes in-line losses, and ensures flow rate, boost pressure, and temperature operating conditions that are optimal for the bearing supporting the main shaft at high speed. It also ensures that assembly is very simple and it reduces the number of parts, thereby contributing to reducing costs and to increasing operating reliability.

The hydrostatic bearing disposed between the low pressure baffle and the high pressure inducer or the high pressure impeller is fed by means of a small portion of the high pressure outlet fluid present in the delivery channel via a short internal recirculation channel formed in the casing and via channels formed in the low pressure baffle, said small portion of fluid recirculated through the hydrostatic bearing being dumped directly to the inlet of the high pressure pump and the outlet of the low pressure pump.

This disposition makes it possible to support the HP shaft with a bearing having a high D.N product (where D is the diameter of the shaft and N is its speed of rotation), and a long lifetime without making assembly complex, and consistent with the general scheme on which the machine operates.

The turbopump includes dynamic sealing means between the secondary shaft constituting the rotor of the low pressure pump and the members secured to the main shaft constituting the rotor of the high pressure pump, which means comprise fluid seals such as wiper labyrinths, rings, or floating rings.

In a preferred embodiment, the turbopump includes first and second successive sets of oppositely-directed seals disposed respectively between the secondary shaft and the rotor of the high pressure pump, and between the secondary shaft and the low pressure baffle secured to the casing.

The fluid seals provide clearance in operation making it possible both to minimize the leakage rate of HP fluid to the outlet of the LP pump, and to adjust the leakage flow rate to the inlet of the LP pump strictly to the requirements of the bearings disposed between the low pressure portion and the high pressure portion, thereby contributing to optimizing leak control. The flow rate thus taken off to lubricate these bearings in the preferred embodiment is obtained without any additional parts or assembly, and is consistent with the general scheme on which the machine operates.

According to another particular feature of the invention, the turbopump includes dynamic sealing means between the members secured to the secondary shaft forming a portion of the rotor of the low pressure pump and the delivery channel which includes fluid seals such as wiper labyrinths leaving clearance in operation that minimizes the fluid flow rates between the high pressure fluid flow at the outlet and the low pressure fluid flow at the inlet.

According to yet another particular feature of the invention, the return channel is delimited by a casting integrated in the casing and provided with reinforcing ribs and a shock absorbing annular gasket is interposed between said casing and the main shaft.

This feature improves the strength of the rotary assembly and contributes to increasing lifetime.

The gas turbine driving the main shaft includes a casing connected via radial studs to the casing of the turbopump.

Thermal decoupling between the pump and the turbine is thus ensured reliably without being detrimental to structural stiffness.

BRIEF DESCRIPTION OF THE DRAWINGS

Other characteristics and advantages of the invention appear from the following description of particular embodiments given by way of example and made with reference to the accompanying drawings, in which.

DETAILED DESCRIPTION OF PARTICULAR EMBODIMENTS

Figure 1:
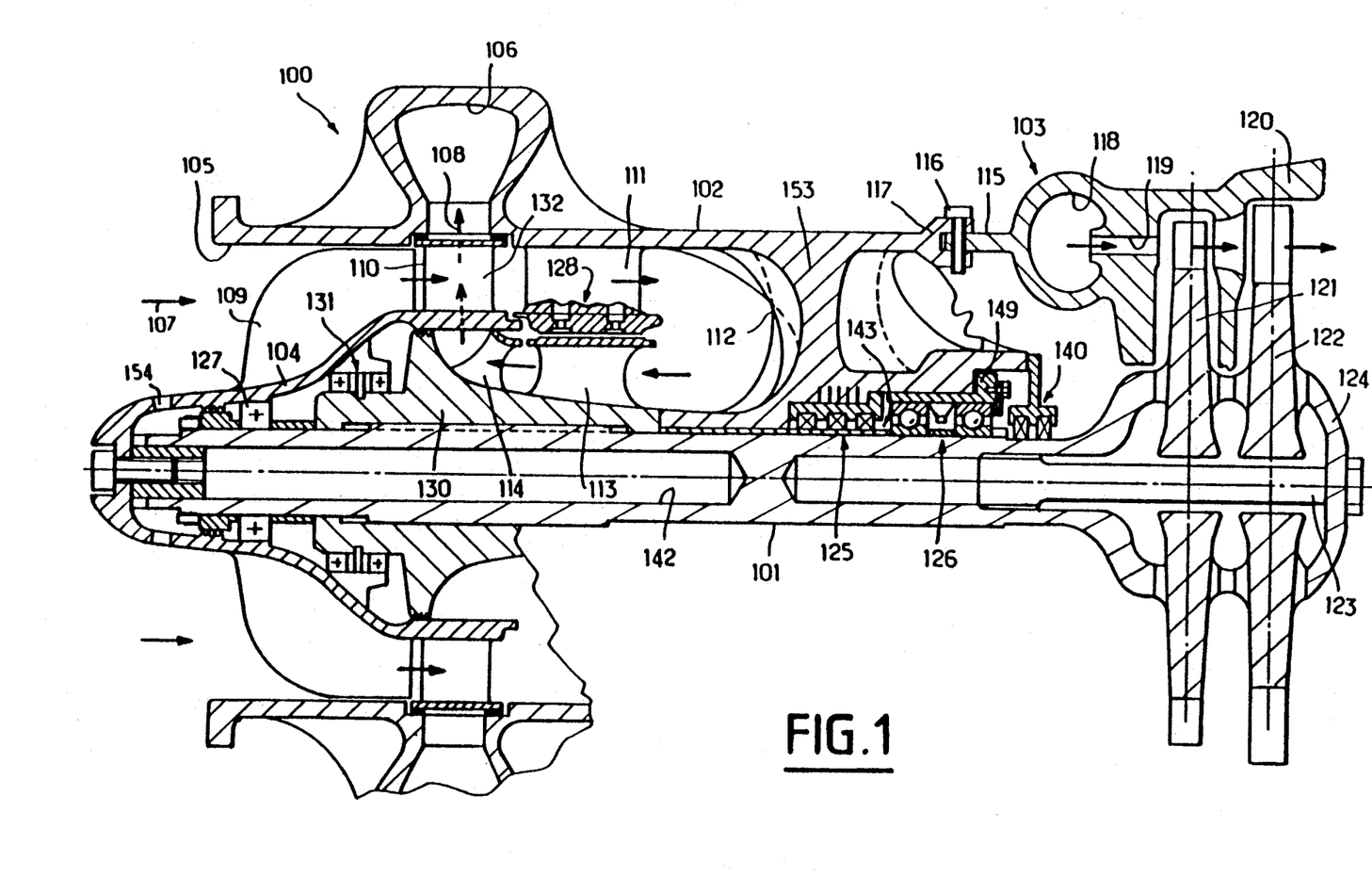
FIG. 1 is an axial section view through a single flow turbopump with integrated boosting, constituting a first embodiment of the invention.

FIG. 1 is an overall view of a single flow turbopump with integrated boosting in accordance with the invention, and which is more particularly intended to pressurize propellant components for a rocket engine.

According to an essential aspect of the invention, a single casing 102 contains the active components of an HP pump driven via a main shaft 101 by an external gas turbine 103, together with the active components of an LP pump secured to a secondary shaft 104 which is coaxial with the main shaft 101, the secondary shaft 104 itself being driven directly by the LP impeller 110 which is provided with curved hollow blades through which the HP fluid from the outlet 108 of the HP pump passes. The HP impeller 114 of the HP pump mounted on the main shaft 101 is integrated inside the LP impeller 110 so as to enable the centrifugal flow of HP fluid 108 delivered by the HP impeller 114 at the specified pressure and flow rate for the machine as a whole to pass through the insides 133 of hollow curved blades 132 forming a portion of the LP impeller 110 (FIGS. 1, 5, 6, and 7) prior to being delivered by a delivery channel 106 to the components that make use of the HP fluid.

The LP impeller 110 disposed in the vicinity of the inlet 105 for the liquid 107 exerts a boost function on the HP impeller 114 which is mounted in cascade relative to the LP impeller 110, by enabling a flow of medium pressure (MP) fluid to be applied to the inlet of the HP impeller 114, which MP fluid is suitable for avoiding cavitation phenomena in the HP impeller 114 at high speeds of rotation.

The high level of performance due to the presence of a boost inlet stage constituted by the LP pump is not obtained to the detriment of compactness insofar as the body of the LP pump is integrated with the body of the HP pump, with both the HP pump and the LP pump being coaxial with the machine.

As mentioned above, a hydraulic turbine for driving the LP impeller 110 is combined with a stage of the LP pump. Integrating a driving hydraulic turbine in the LP boost impeller 110 contributes to increasing the compactness of the assembly.

The LP pump comprises a rotor constituted by the secondary shaft 104 which carries an LP inducer 105 at its inlet constituting a first suction stage having a large inlet diameter which facilitates obtaining high suction capacity. At least one stage of the LP pump constituting the LP impeller 110 is provided with fairing and hollow blades 132 to enable hydraulic turbine operation by the HP fluid 108 flowing through the insides 133 of the hollow blades 132.

Figure 5:
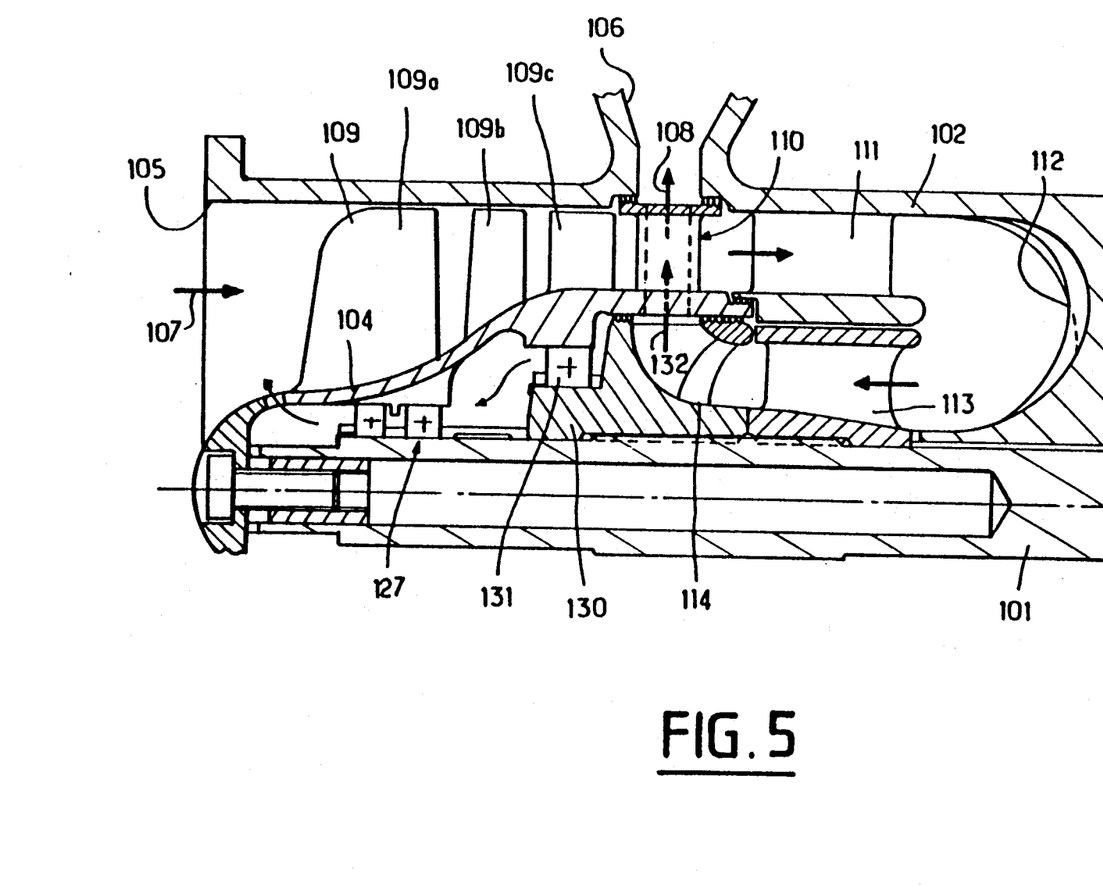
FIG. 5 is a fragmentary axial half-section view through a variant embodiment of the FIG. 1 turbopump showing the use of a low pressure boost pump having a plurality of stages.
Figure 6:
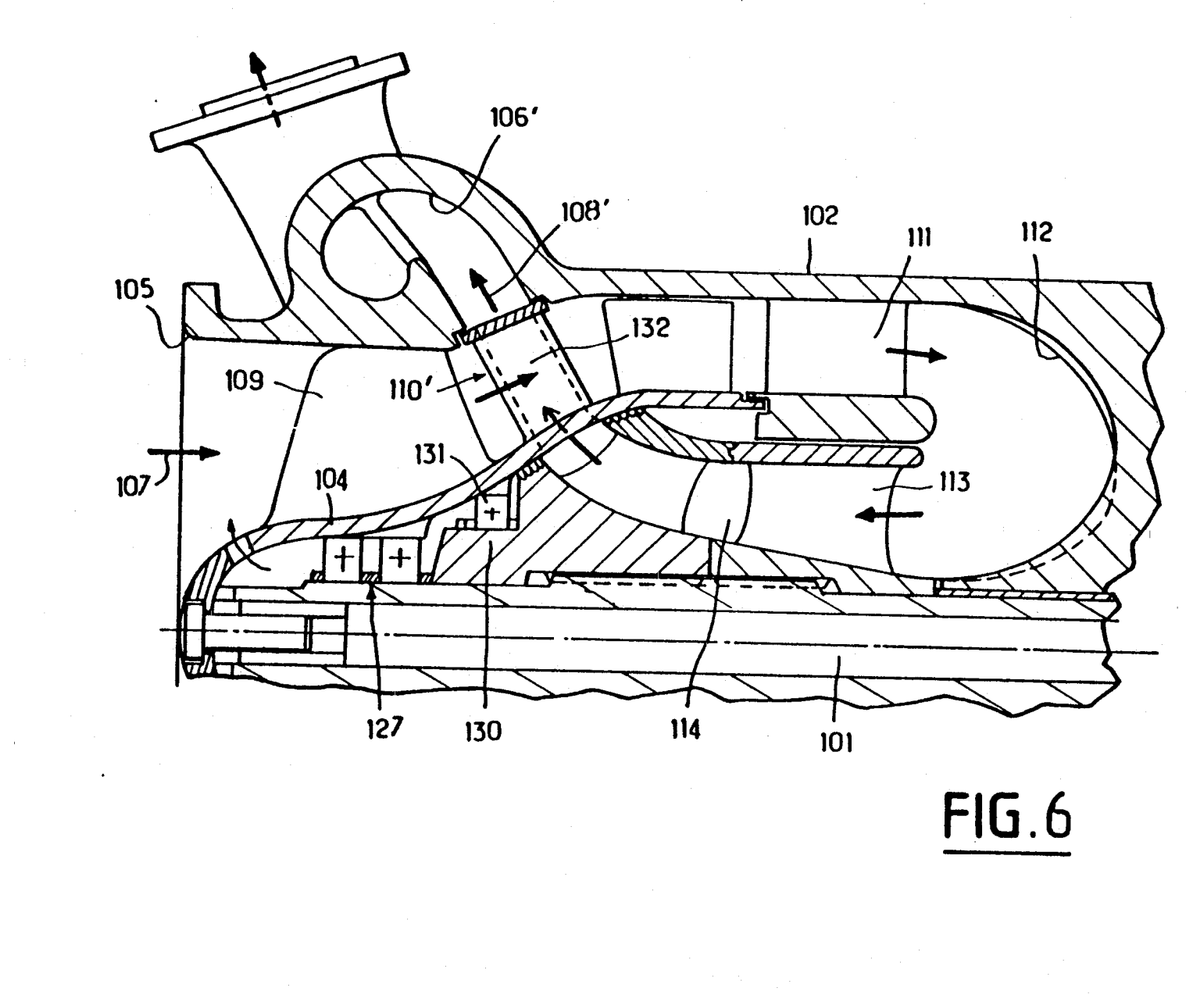
FIG. 6 is a fragmentary axial half-section view through a variant embodiment of the FIG. 1 turbopump showing a configuration in which the fluid loop flowing through the turbopump has a figure-of-eight shape, with the low pressure boost pump being of the helico-centrifugal type.
Figure 7:
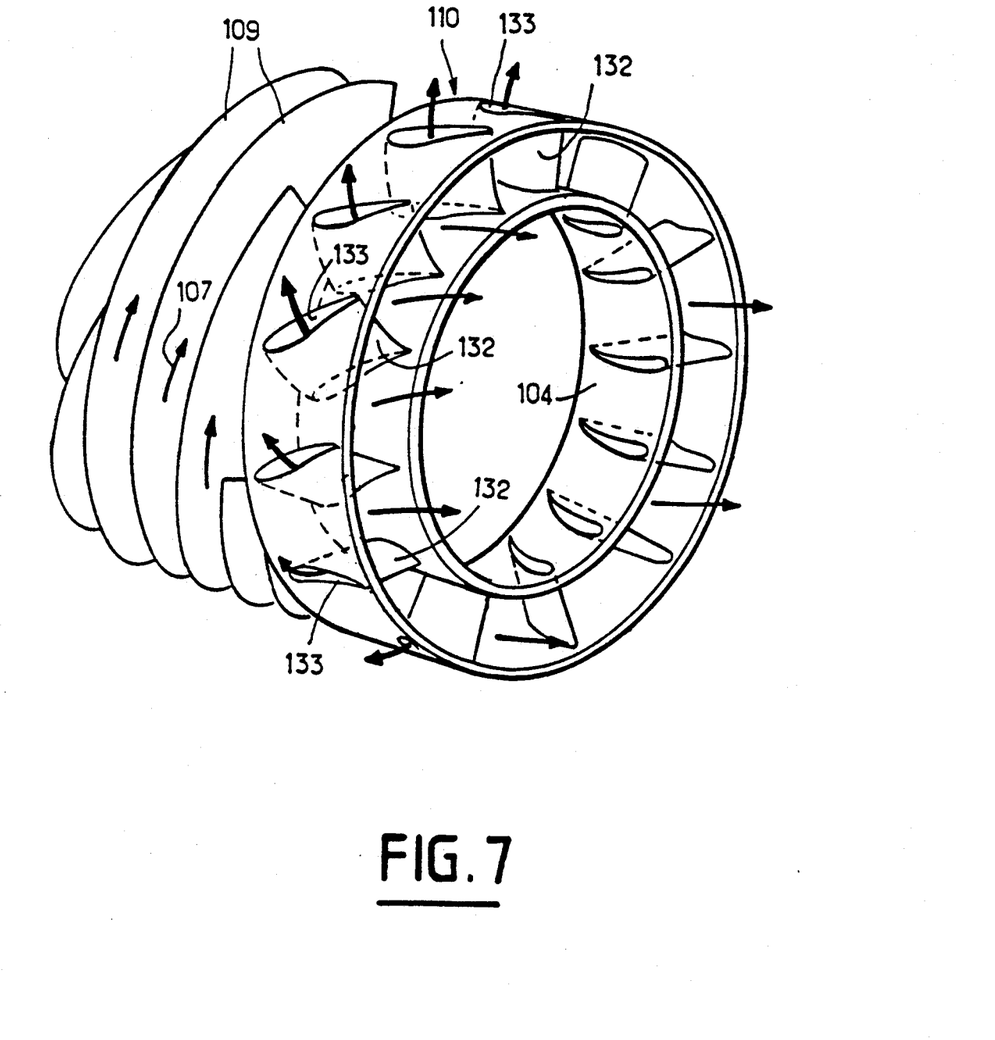
FIG. 7 is a perspective view of a mechanical energy exchanger constituted by a turbine-impeller having hollow blades, as used in the FIG. 1 turbopump.

In the embodiments of FIGS. 1 and 6, the LP pump has only one LP inducer 109 and one LP impeller 110, 110' which also constitutes a hydraulic turbine, whereas FIG. 5 shows an embodiment of an LP pump having a larger number of stages 109a, 109b, and 109c disposed upstream from the faired LP impeller 110 providing the hydraulic turbine function.

The connection between the outlet of the LP pump and the inlet of the HP pump includes a baffle 111 mounted on the casing 102 of the HP and LP pump assembly and serving to bring the hydraulic flow back onto the axis of the machine so as to avoid any pre-rotation of the fluid at the inlet to the HP impeller 114, in association with a return channel 112 which deflects the flow of medium pressure fluid at the outlet from the baffle 111 through 180° to return it towards the HP impeller 114 parallel to the axis of the turbopump.

Figure 12:
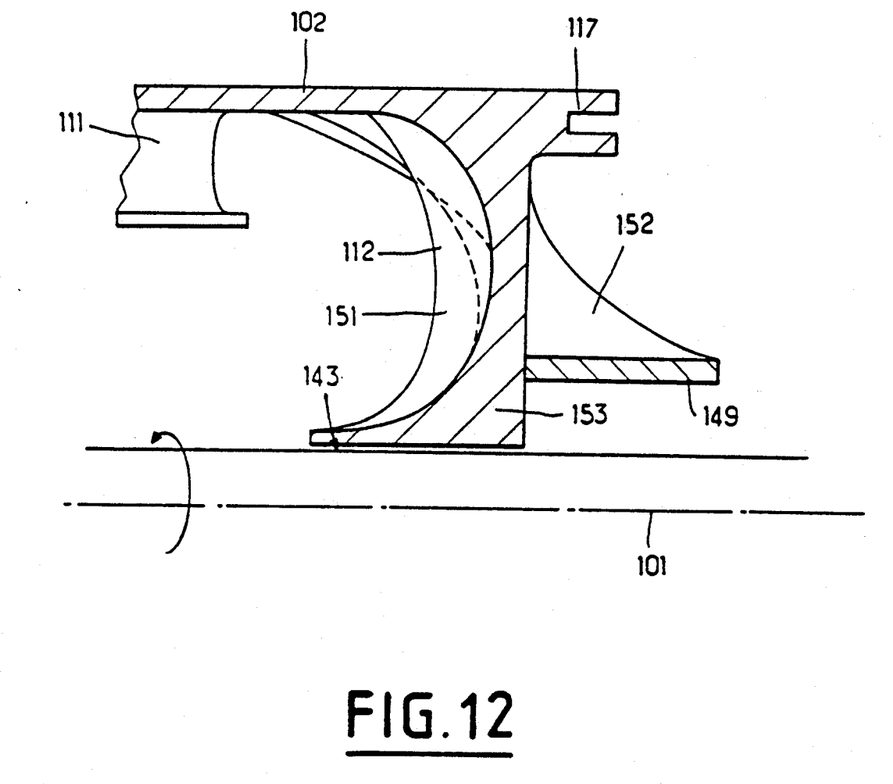
FIG. 12 is a detail view in axial half-section showing one example of the backplate of the high pressure main pump of the FIG. 1 turbopump.

FIG. 12 shows in greater detail the backplate 153 of the pump together with the return channel 112. The return channel 112 is obtained using simple, open shapes starting from a casting 153 provided with ribs or fins 151 and 152 and integral with the pump casing 102, thereby increasing the structural stiffness while leaving a place 143 for receiving a shock absorbing annular gasket 125 between the shaft 101 and the return channel 112. This characteristic makes it possible to obtain a rotary assembly that is stronger, and it contributes to obtaining a long lifetime.

The backplate assembly 153 serves to obtain a housing 149 on the outside wall of the return channel 112 for the purpose of receiving a bearing 126 together with its sealing system 140 (FIG. 1), for the purpose of receiving the rear portion of the main shaft 101 that is secured to the gas turbine 103.

The casing 120 of the gas turbine 103 may be fixed by means of radial studs 116 passing through an end 115 that is directly engaged in flanges 117 formed on the backplate 153 (FIG. 1).

The above-described measures make it possible to obtain good thermal decoupling between the pump and the turbine without detriment to the structural stiffness thereof.

The rotor 130 of the HP pump driven directly by the main central shaft 101 is constituted by an inducer 113 (which may be optional) and by an impeller 114. The HP impeller 114 may be axial, helico-centrifugal, or centrifugal, depending on its specific speed.

The HP pump returns the centrifugal flow at high pressure towards the stage 110 of the LP pump. The HP fluid 108 passes through the hollow curved blades 132 of the LP impeller 110 and is dumped into the delivery channel 106, thereby producing the driving torque for the LP impeller 110, said driving torque resulting from the change in momentum.

The hollow blades 132 through which the entire high pressure flow passes are thus externally driving blades and internally driven blades, with the power transmitted driving the LP pump.

Figure 10:
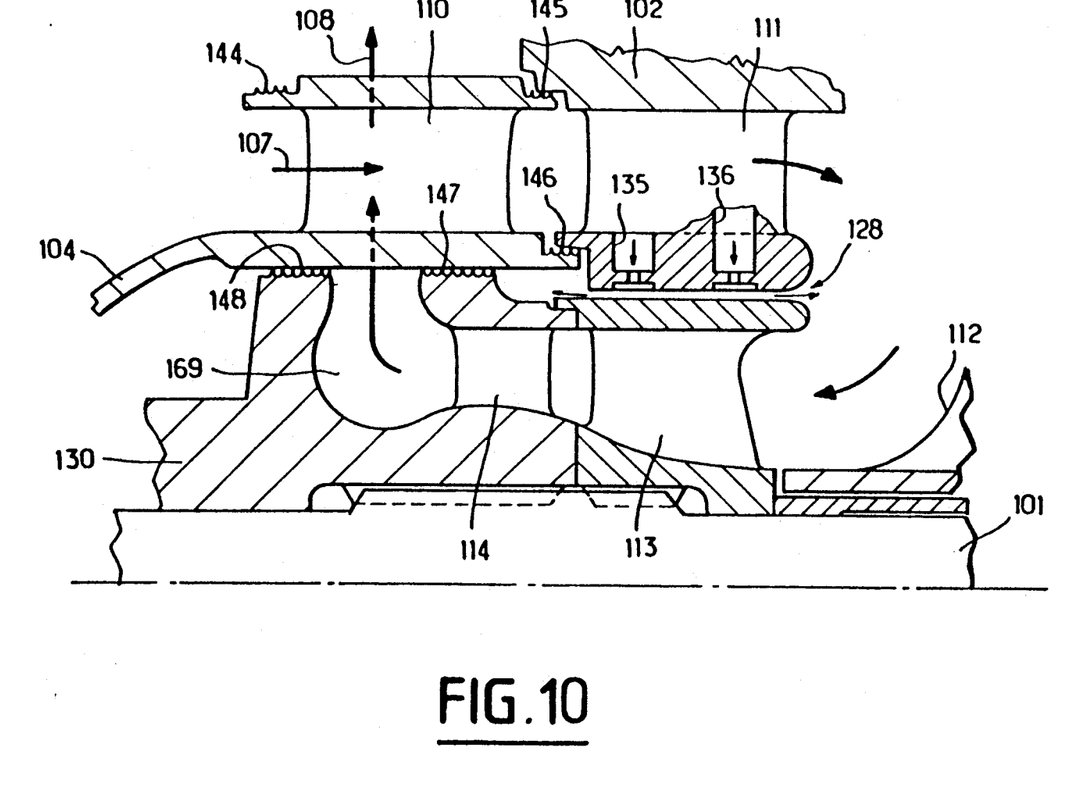
FIG. 10 is a detail view in axial half-section showing one example of a rotary volute in a particular embodiment of the FIG. 1 turbopump.

The use of this principle at high specific speeds for the HP impeller 114 gives rise to a rotating volute 169 appearing downstream from the impeller prior to the flow passing through the hollow blades 132 (FIG. 10).

The delivery channel 106 may be constituted by a volute or by a torus.

The design of a turbopump of the invention is based on a scheme of operation whereby the fluid flows through a loop, said loop being in the form of an open figure-of-eight shape whose details are a function of the performance required of the various components (boost pump, HP pump) and of fitting constraints.

By way of example, FIGS. 1 and 5 show an arrangement adapted to cases where a large amount of hydraulic power is developed on the HP pump, while FIG. 6 shows an arrangement adapted to cases where the power distribution between the LP pump and the HP pump are more symmetrical. In such cases, the resulting shape of the LP pump is helico-centrifugal and the hydraulic forces on the rotary assemblies are better distributed, thereby facilitating axial balancing of the machine.

More particularly, FIGS. 1 and 5 show a hydraulic circuit constituted initially by a boost pump in which the hydraulic stream is parallel to the axis of the machine, followed secondly by a high pressure pump which delivers the HP fluid in a plane perpendicular to the axis of the machine via the LP stage which is provided with hollow blades 132.

This disposition is more particularly adapted to low specific speeds giving rise to HP impellers 114 of the centrifugal type and corresponding in general to fluids that are dense. It facilitates adjusting dynamic sealing since it makes use only of clearances that are strictly radial, and that are suitable for compensating automatically. Unfortunately, a large axial force is established. Under such circumstances, as in conventional machines, it is necessary to implement an axial balancing device which may be installed at the end of the boost pump or may be constituted by an active balancing turntable integral with the high speed shaft 101.

In the embodiment of FIG. 6, the hydraulic circuit is initially constituted by an LP pump 110' that is helico-centrifugal and is preceded by an inducer 109, and is followed secondly by an HP pump delivering HP fluid in a plane that is inclined at an angle of less than 90° relative to the axis of the machine towards the LP stage provided with hollow blades 132.

This disposition is more particularly adapted to high specific speeds giving rise to HP impellers of the helico-centrifugal or axial type and corresponding generally to fluids that are of low density. It makes it possible to obtain an axial force resultant that is relatively small, and that can easily be taken up by a balancing device installed on the boost pump, for example. In contrast, this disposition has a higher amount of fluid recirculation.

Particular examples of the way in which the main shaft 101 and the secondary shaft 104 are mounted using various types of bearing are now described in greater detail.

The high speed main shaft 101 is mounted firstly by means of a hydrostatic bearing 128 disposed between the LP baffle 111 integral with the casing 102 and the HP inducer 113 integral with the main shaft 101, and secondly by means of a bearing 126 suitable for use at high speeds, such as a pair of ball bearings mounted in the backplate 153 of the return channel 112.

The low pressure secondary shaft 104 is itself mounted on the main shaft 101 via a roller bearing 131 and a pair of ball bearings 127 at its end facing the gas turbine 103.

This four-bearing disposition makes it possible to obtain a high speed of rotation for the main shaft 101 and free rotation for the low pressure assembly which is driven by the hydraulic turbine.

It will be observed that the bearings disposed between the LP pump and the HP pump rotate at a relatively low speed which corresponds to the difference between the speeds of rotation of the main shaft 101 and of the secondary shaft 104, such that wear in these bearings is relatively slow.

Figure 8:
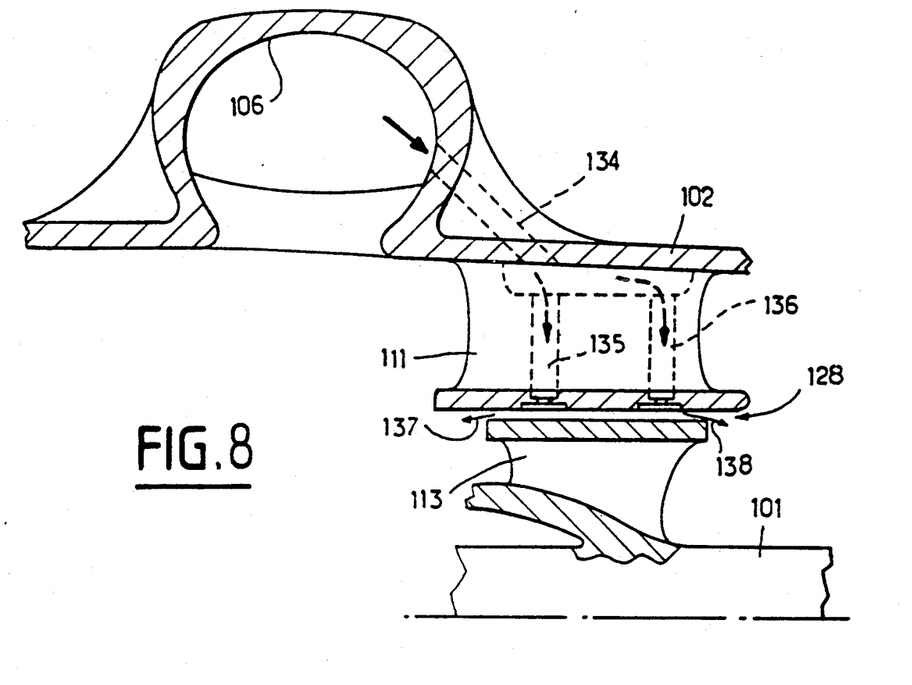
FIG. 8 is a detail view in axial half-section showing one particular way of feeding a hydrostatic bearing used in the FIG. 1 turbopump.

As can be seen in FIGS. 8 and 10, the hydrostatic bearing 128 uses a fraction of the HP pump flow by directly taking off a portion of the HP fluid 108 present in the delivery channel 106 via a direct and short recirculation channel 134, 135, and 136 integrated in the casing.

This small flow rate is exhausted at medium pressure (MP) firstly to the inlet of the HP pump (flow 137) and secondly to the outlet of the LP pump (flow 138) without requiring additional parts.

This disposition makes it possible to support the main shaft 101 with a long lifetime bearing having a high D.N product where D is the diameter of the shaft 101 and N is its speed of rotation, which is consistent with the general scheme on which the machine operates.

Figure 9:
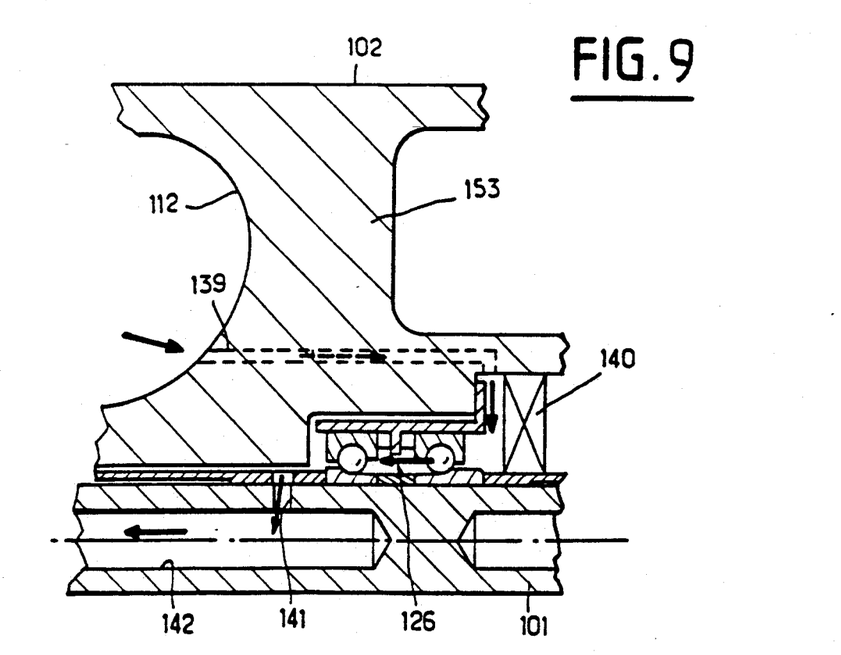
FIG. 9 is a detail view in axial half-section showing one particular way of recirculating fluid to a turbine bearing in the FIG. 1 turbopump.

FIG. 9 shows an embodiment of a bearing 126 for supporting the main shaft 101 at its end adjacent to the gas turbine 103. It can be seen that this bearing 126 which is constituted, for example, by a pair of bearings, is lubricated and cooled by a recirculated flow taken from the outlet of the baffle 111 in a medium pressure zone via the backplate 153 delimiting the return channel 112, via a recirculation channel 139 constituting a pickup point close to the bearing 126. The flow rate taken off and used for lubricating the bearing 126 is exhausted to a point of the machine that is at low pressure, such as the inlet to the LP pump, for example, via a circuit including a passage 141, a channel 142 included in the main shaft 101 and coaxial therewith (FIG. 9), and an outlet passage 154 through the secondary rotor 104 (FIG. 1). Such a disposition avoids any external pipework, minimizes in-line losses, and provides flow rate, boost pressure, and temperature operating conditions that are optimal for the bearing 126 supporting the high speed shaft 101.

It may be observed that the pair of ball bearings 126 shown in FIG. 9 may be replaced by some other type of bearing adapted to high speed. The bearing 126 may thus be a fluid bearing or a foil bearing fed with medium pressure fluid via a recirculation channel entirely analogous to the channel 139 in FIG. 9.

Similarly, the bearing 126 may also be constituted by an active magnetic bearing cooled by a low flow rate of medium pressure fluid taken via the recirculation channel 139;

The gasket 140 serves under all circumstances to provide sealing relative to the zone in which the gas turbine 103 is situated.

The gas turbine 103 may comprise one or more stages 121, 122 mounted directly on the end of the main shaft 101 and providing the power required by both the HP pump and the LP pump.

In the embodiment shown in FIG. 1, the turbine wheels 121 and 122 are mounted by means of a long tie 123 coaxial with the main shaft 101, and by a resilient thrust member 124 for limiting differential expansion between the parts. The turbine 103 includes a casing 120 including a hot gas feed channel 118 and an annular space 119 for applying the hot gases to the blades of the wheels 121 and 122. As already mentioned, one end of the casing 120 of the turbine 103 may be connected to the casing 102 of the HP pump and the LP pump via a connection including radial studs 116.

Figure 11:
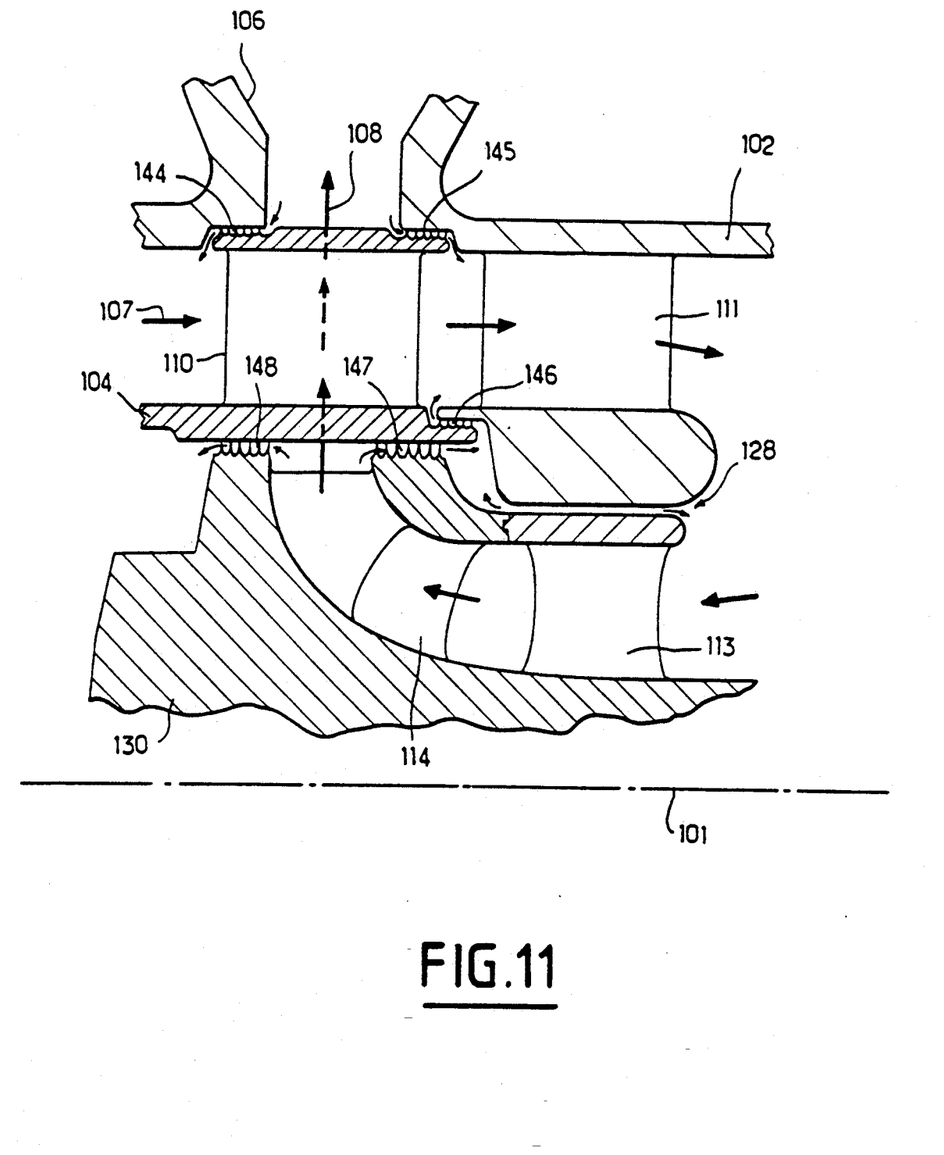
FIG. 11 is a detail view in axial half-section showing one example of how dynamic seals may be made between the low pressure portion and the high pressure portion in a particular embodiment of the FIG. 1 turbopump.

FIGS. 10 and 11 show examples of dynamic sealing achieved between the secondary shaft 104 constituting the rotor of the LP pump and the members 130, 114 secured to the main shaft 101 constituting the rotor of the HP pump. Fluid seals 147 and 148 such as wiper labyrinths, rings, or floating rings, are thus disposed between the rotor 104 and the support 130 of the HP impeller 114. A fluid seal 146 is also disposed between the secondary rotor 104 and the LP baffle 111, with an opening opposing that of the fluid seals 147 and 148.

Dynamic sealing means 144 and 145 are also disposed between the LP impeller 110 mounted on secondary rotor 104 and the delivery channel 106. In the same manner, these dynamic sealing means include dynamic seals such as wiper labyrinths that leave operating clearance to minimize fluid flow rates between the HP fluid flow 108 at the outlet and the outlet and the LP flow at the inlet 107.

The operating clearances of the various fluid seals also serve to regulate the leakage flow rate to the outside of the LP pump to the strict requirements of the low pressure/high pressure bearings, thereby assisting in providing optimum handling of leaks. The flow rate thus taken off to lubricate these bearings in the preferred embodiment of the invention is obtained without requiring any additional assembly or parts.

I claim:

1. A single flow turbopump with integrated boosting for pressurizing a fluid, comprising within a single casing:
   a main shaft driven by a turbine;
   a secondary shaft coaxial with the main shaft;
   at least one low pressure inducer mounted inside the casing on the secondary shaft in the vicinity of an inlet for low pressure fluid;
   at least one low pressure impeller mounted on the secondary shaft downstream from the low pressure inducer;
   a low pressure baffle secured to the casing and disposed downstream from the low pressure impeller to restore the medium pressure fluid flow to a direction parallel to the axis of the turbopump;
   a return channel for deflecting the medium pressure fluid flow from the baffle through 180° and for returning said flow parallel to the axis of the turbopump towards a high pressure impeller mounted on the main shaft inside the secondary shaft in such a manner as to deliver an entire high pressure centrifugal flow formed by the high pressure impeller through the insides of curved hollow blades forming a portion of said low pressure impeller, said high pressure centrifugal flow flowing through the insides of said curved hollow blades generating driving torque for the low pressure impeller; and
   a delivery channel secured to the casing and collecting the high pressure fluid after it has passed through said curved hollow blades, the high pressure impeller constituting a high pressure pump coupled to a low pressure boost pump constituted by the low pressure inducer and the low pressure impeller and constituting a unitary assembly.

2. A turbopump according to claim 1, further including a high pressure inducer mounted on the main shaft between the return channel and the high pressure impeller.

3. A turbopump according to claim 1, wherein the low pressure boost pump defines a medium pressure fluid flow which is essentially parallel to the axis of the turbopump, whereas the high pressure pump is arranged in such a manner that the high pressure impeller delivers the high pressure fluid via the insides of the curved hollow blades in a plane that is essentially perpendicular to the axis of the turbopump.

4. A turbopump according to claim 2, wherein the main shaft driven at high speed by the turbine is mounted relative to the casing firstly by means of a hydrostatic bearing disposed between the low pressure baffle and a first one of the high pressure inducer and the high pressure impeller, and secondly by a high speed bearing mounted in a backplate of the return channel.

5. A turbopump according to claim 4, wherein the secondary shaft is mounted on the main shaft via a roller bearing and via a pair of ball bearings.

6. A turbopump according to claim 4, wherein said bearing mounted in the backplate of the return channel is a ball bearing that is lubricated and cooled by a low flow rate of medium pressure fluid taken from the outlet of the low pressure baffle via a short recirculation channel in the wall of the return channel.

7. A turbopump according to claim 4, wherein said bearing mounted in the backplate of the return channel is a first one of a fluid bearing and a foil bearing fed with a small flow rate of medium pressure fluid taken from the outlet of the low pressure baffle by a short recirculation channel formed in the wall of the return channel.

8. A turbopump according to claim 6, wherein the low flow rate of medium pressure fluid taken via said recirculation channel is dumped at a low pressure point of the turbopump via a channel included in the main shaft and coaxial therewith.

9. A turbopump according to claim 4, wherein the hydrostatic bearing disposed between the low pressure baffle and a first one of the high pressure inducer and the high pressure impeller is fed by means of a small portion of the high pressure outlet fluid present in the delivery channel via a short internal recirculation channel formed in the casing and via channels formed in the low pressure baffle, said small portion of fluid recirculated through the hydrostatic bearing being dumped directly to the inlet of the high pressure pump and the outlet of the low pressure pump.

10. A turbopump according to claim 1, including dynamic sealing means between the secondary shaft constituting the impeller of the low pressure pump and members secured to the main shaft constituting a rotor of the high pressure pump, which means comprise fluid seals.

11. A turbopump according to claim 1, including dynamic sealing means between members secured to the secondary shaft forming a portion of the impeller of the low pressure pump and the delivery channel which includes fluid seals leaving clearance in operation that minimizes fluid flow rates between the high pressure fluid flow at the outlet and the low pressure fluid flow at the inlet.

12. A turbopump according to claim 4, wherein the return channel is delimited by a casting integrated in the casing and provided with reinforcing ribs and wherein a shock absorbing annular gasket is interposed between said casing and the main shaft.

13. A turbopump according to claim 1, wherein the gas turbine driving the main shaft includes a casing connected via radial studs to the casing of the turbopump.

14. A turbopump according to claim 8, wherein said low pressure point is located at the inlet of the low pressure pump.

15. A turbopump according to claim 10, wherein said fluid seals comprise at least one of the following elements: wiper labyrinths, rings, and floating rings.

16. A turbopump according to claim 11, wherein said fluids seals comprise wiper labyrinths.

17. A single flow turbopump with integrated boosting for pressurizing a fluid, comprising within a single casing:
- a main shaft driven by a turbine;
- a secondary shaft coaxial with the main shaft;
- at least one low pressure inducer mounted inside the casing on the secondary shaft in the vicinity of an inlet for low pressure fluid;
- at least one low pressure impeller of the helio-centrifugal type mounted on the secondary shaft downstream from the low pressure inducer;
- a low pressure baffle secured to the casing and disposed downstream from the low pressure impeller to restore the medium pressure fluid flow to a direction parallel to the axis of the turbopump;
- a return channel for deflecting the medium pressure fluid flow from the baffle through 180° and for returning said flow parallel to the axis of the turbopump towards a high pressure impeller arranged in such a manner on the main shaft inside the secondary shaft such that the high pressure impeller delivers a high pressure fluid via the insides of curved hollow blades of the low pressure impeller in a plane that is inclined at an angle of less than 90° relative to the axis of the turbopump, said high pressure centrifugal flow flowing through the insides of said curved hollow blades generating driving torque for the low pressure impeller; and
- a delivery channel secured to the casing and collecting the high pressure fluid after it has passed through said curved hollow blades, the high pressure impeller constituting a high pressure pump coupled to a low pressure boost pump constituted by the low pressure inducer and the low pressure impeller and constituting a unitary assembly.

18. A turbopump according to claim 17, wherein the main shaft driven at high speed by the turbine is mounted relative to the casing firstly by means of a hydrostatic bearing disposed between the low pressure baffle and a first one of a high pressure inducer mounted on the main shaft between the return channel and the high pressure impeller, and secondly by an active magnetic bearing mounted in a backplate of the return channel and cooled by a low flow rate of medium pressure fluid taken from the outlet of the low pressure baffle by a short recirculation channel formed in the wall of the return channel.

19. A turbopump according to claim 17, including dynamic sealing means between the secondary shaft constituting a rotor of the low pressure pump and members secured to the main shaft constituting a rotor of the high pressure pump, which means comprise first and second successive sets of oppositely-directed seals disposed respectively between the secondary shaft and the rotor of the high pressure pump, and between the secondary shaft and the low pressure baffle secured to the casing.

* * * * *